United States Patent
Munir et al.

(10) Patent No.: US 9,663,251 B2
(45) Date of Patent: May 30, 2017

(54) THRUSTER SUPPORT MECHANISM FOR SATELLITE PROPULSION

(71) Applicant: Space Systems/Loral, LLC, Palo Alto, CA (US)

(72) Inventors: Mohammad Saghir Munir, San Ramon, CA (US); Walter Gelon, Redwood City, CA (US); Darren Stratemeier, Mountain View, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 116 days.

(21) Appl. No.: 14/580,063

(22) Filed: Dec. 22, 2014

(65) Prior Publication Data
US 2016/0176545 A1    Jun. 23, 2016

(51) Int. Cl.
*B64G 1/26* (2006.01)
*B64G 1/24* (2006.01)
*B64G 1/40* (2006.01)

(52) U.S. Cl.
CPC .............. *B64G 1/26* (2013.01); *B64G 1/242* (2013.01); *B64G 1/405* (2013.01)

(58) Field of Classification Search
CPC . B64G 1/26; B64G 1/40; B64G 1/401; B64G 1/405; B64G 1/402; B64G 1/242
See application file for complete search history.

(56) References Cited

U.S. PATENT DOCUMENTS

| | | | | |
|---|---|---|---|---|
| 3,893,573 A | * | 7/1975 | Fletcher | B25J 3/04 244/172.5 |
| 4,825,646 A | * | 5/1989 | Challoner | F03H 1/0037 244/169 |
| 4,955,559 A | * | 9/1990 | Kaminskas | B64G 1/26 244/169 |

(Continued)

OTHER PUBLICATIONS

Corey, Ronald L., et al. "Performance and evolution of stationary plasma thruster electric propulsion for large communications satellites." AIAA Paper 8688 (2010).*

(Continued)

*Primary Examiner* — Tien Dinh
*Assistant Examiner* — Alexander V Giczy
(74) *Attorney, Agent, or Firm* — Weaver Austin Villeneuve & Sampson LLP

(57) ABSTRACT

Techniques for performing orbit raising, north-south stationkeeping, east-west stationkeeping, and momentum management with thrusters disposed on a spacecraft are disclosed. The spacecraft includes at least one thruster support mechanism (TSM), including a pointing arrangement and an elongated structural member, the structural member having a long dimension defining a first axis a proximal portion of the structural member is attached to the pointing arrangement each of the thrusters is fixedly coupled with a distal portion of the structural member. The pointing arrangement includes a first, second, and third revolute joint, the first revolute joint being rotatable about the first axis; the third revolute joint being rotatable about a third axis, the third axis being fixed with respect to the spacecraft; and the second (Continued)

View D-D revolute joint being rotatable about a second axis, the second axis being orthogonal to each of the first axis and the third axis.

15 Claims, 8 Drawing Sheets

(56) References Cited

U.S. PATENT DOCUMENTS

| | | | | |
|---|---|---|---|---|
| 5,349,532 | A * | 9/1994 | Tilley | B64G 1/26 244/164 |
| 5,400,252 | A * | 3/1995 | Kazimi | B64G 1/26 244/169 |
| 5,810,295 | A | 9/1998 | Anzel | |
| 5,813,633 | A | 9/1998 | Anzel | |
| 6,032,904 | A | 3/2000 | Hosick et al. | |
| 6,296,207 | B1 * | 10/2001 | Tilley | B64G 1/242 244/165 |
| 6,481,672 | B1 * | 11/2002 | Goodzeit | B64G 1/26 244/169 |
| 6,565,043 | B1 | 5/2003 | Wittmann | |
| 6,637,701 | B1 | 10/2003 | Glogowski et al. | |
| 7,059,571 | B2 | 6/2006 | Kellberg | |
| 2009/0166476 | A1 | 7/2009 | Termini | |
| 2013/0292516 | A1 | 11/2013 | Celerier | |
| 2013/0313369 | A1 | 11/2013 | Celerier | |
| 2016/0167810 | A1 * | 6/2016 | Janu | B64G 1/24 244/171.2 |

OTHER PUBLICATIONS

JPL, DSCS III Quicklook, http://space.jpl.nasa.gov/msl/QuickLooks/dscs3QL.html, archived by Internet Archive on Oct. 16, 2011, http://web.archive.org/web/20111016063105/http://space.jpl.nasa.gov/msl/QuickLooks/dscs3QL.html, accessed Jun. 9, 2016.*

Gunther's Space Page, DSCS 3, http://space.skyrocket.de/doc_sdat/dscs-3.htm, archived by Internet Archive on Apr. 11, 2013, http://web.archive.org/web/20130411191935/http://space.skyrocket.de/doc_sdat/dscs-3.htm, accessed Jun. 9, 2016.*

Phillippe Fournier-Viger, et al., "A Multiparadigm Intelligent Tutoring System for Robotic Arm Training", IEEE Transactions on Learning Technologies 6(4):364-377 • Oct. 2013; accessed on ResearchGate, https://www.researchgate.net/publication/260711694_A_Multiparadigm_Intelligent_Tutoring_System_for_Robotic_Arm_Training , accessed on Sep. 29, 2016.*

Canadian Space Agency, "Canadarm and Canadarm2—Comparative table", modified Dec. 31, 2002; http://www.asc-csa.gc.ca/eng/iss/canadarm2/c1-c2.asp, accessed Sep. 29, 2016.*

Anzel, B., "Stationkeeping the hughes HS 702 satellite with a xenon ion propulsion system," IAF-98-A.1.09, 49th International Astronautical Congress, Sep. 28-Oct. 2, 1998, Melbourne, Australia.

Corey, R. et al., "Performance and evolution of stationary plasma thruster electric propulsion for large communications satellites," AIAA 2010-8688, 28th AIAA International Communications Satellite Systems Conference (ICSSC-2010), Aug. 30-Sep. 2, 2010, Anaheim, California, American Institute of Aeronautics and Astronautics, Inc. 2010.

Goebel, D. et al., "Qualification of commercial XIPS ion thrusters for NASA deep space missions," AIAA 2008-4914, 44th AIAA/ASME/SAE/ASEE Joint Propulsion Conference & Exhibit, Jul. 21-23, 2008, Hartford, CT, American Institute of Aeronautics and Astronautics, Inc. 2008.

* cited by examiner

THRUSTER SUPPORT MECHANISM FOR SATELLITE PROPULSION

TECHNICAL FIELD

This invention relates generally to spacecraft and, in particular, to techniques for supporting and three-axis positioning thrusters for such spacecraft.

BACKGROUND

The assignee of the present invention manufactures and deploys spacecraft for, commercial, defense and scientific missions. Many such spacecraft operate in a geosynchronous orbit having a period equal to one sidereal day (approximately 23.93 hours).

Such spacecraft are equipped with on board propulsion systems, including chemical and/or electric thrusters, for orbit raising from a launch vehicle transfer orbit (or "parking orbit") to an operational orbit, for example, to a geosynchronous orbit; for stationkeeping once disposed in the operational orbit; and for attitude control/momentum management purposes.

In general, the known techniques provide that individual thrusters are relatively "specialized" with respect to the mission functions each thruster performs. For example, propulsion subsystems have been configured whereby electric thrusters perform north south stationkeeping and momentum management, but not orbit raising. As a further example, some propulsion subsystems have been configured whereby electric thrusters perform some orbit raising and/or north south stationkeeping, but separate chemical thrusters perform east-west stationkeeping and some orbit raising. Such a system is disclosed in U.S. Pat. No. 6,032,904, issued to Hosick (hereinafter, "Hosick") and assigned to the assignee of the present invention, the disclosure of which is hereby incorporated in its entirety into the present disclosure for all purposes. Additional station-keeping and momentum management techniques are described in U.S. Pat. Nos. 4,767,084, 6,296,207, and U.S. Pat. Pub. 2014-0138491, assigned to the assignee of the present invention, the disclosures of which are incorporated by reference into the present application for all purposes.

Improved techniques are desirable to enable meeting the full gamut of propulsion missions with a reduced equipment manifest while providing adequate redundancy/high reliability.

SUMMARY

The present inventor has appreciated that a propulsion system may be configured to require a reduced number of thrusters, performing multiple propulsion mission functions, including all of: orbit raising/lowering, stationkeeping (N-S and E-W), and momentum management. In some implementations, as few as two thrusters are selectably positioned to perform all the above-mentioned functions, in a system that has no single point failure mechanisms.

According to some implementations, a spacecraft includes a main body, at least one thruster and a thruster support mechanism (TSM). The TSM includes a pointing arrangement and an elongated structural member, the structural member having a long dimension defining a first axis. A proximal portion of the structural member is attached to the pointing arrangement. The at least one thruster is fixedly coupled with a distal portion of the structural member, and the pointing arrangement includes a first revolute joint, a second revolute joint, and a third revolute joint, the first revolute joint being rotatable about a first axis, the third revolute joint being rotatable about a third axis, the third axis being fixed with respect to the main body; and the second revolute joint being rotatable about a second axis, the second axis being orthogonal to each of the first axis and the third axis.

In some examples, the TSM may be articulable over a range of positions and orientations such that the at least one thruster may be selectably disposed so as to impart to the spacecraft a velocity change, a torque, or both for a selected one or both of orbit control and momentum management. The orbit control may include at least two of orbit raising, orbit lowering, north-south stationkeeping, east-west stationkeeping, and eccentricity control. In some examples, the TSM may be articulable only by way of the first revolute joint, the second revolute joint, and the third revolute joint. In some examples, the TSM may be articulable such that the at least one thruster may be selectably disposed so as to simultaneously perform north-south stationkeeping and east-west stationkeeping. In some examples, the TSM may be articulable such that the at least one thruster may be selectably disposed so as to simultaneously perform north-south stationkeeping, east-west stationkeeping and momentum management. In some examples, the TSM may be articulable such that the at least one thruster may be selectably disposed so as to simultaneously perform orbit raising and momentum management.

In some examples, the spacecraft includes no thrusters other than the at least one thruster fixedly coupled with the distal portion of the structural member. In some examples, the at least one thruster is an electric thruster.

In some examples, the third revolute joint may be proximate to a main body of the spacecraft, the first revolute joint may be proximate to the proximal portion of the structural member, and the second revolute joint may be disposed between the first revolute joint and the third revolute joint. In some examples, the third revolute joint may be proximate to an aft surface of the main body of the spacecraft. In some examples, the third axis may be parallel to a yaw axis of the spacecraft, the yaw axis being substantially aligned with an orbit radius during a stationkeeping maneuver.

According to some implementations, a method includes raising an orbit of a spacecraft, with at least one thruster disposed on the spacecraft, and performing, with the at least one thruster, one or more of north-south stationkeeping, east-west stationkeeping, and momentum management. The spacecraft includes at least one thruster support mechanism (TSM), the at least one TSM including a pointing arrangement and an elongated structural member, the structural member having a long dimension defining a first axis. A proximal portion of the structural member is attached to the pointing arrangement. The at least one thruster is fixedly coupled with a distal portion of the structural member. The pointing arrangement includes a first revolute joint, a second revolute joint, and a third revolute joint, the first revolute joint being rotatable about a first axis, the third revolute joint being rotatable about a third axis, the third axis being fixed with respect to the spacecraft; and the second revolute joint being rotatable about a second axis, the second axis being orthogonal to each of the first axis and the second axis.

In some examples, the method further includes articulating the TSM from a first position and orientation to a second position and orientation, wherein, the raising the orbit occurs with the TSM disposed in the first orientation and position and the performing one or more of north-south stationkeeping, east-west stationkeeping, and momentum management occurs with the TSM disposed in the second orientation.

According to some implementations, a spacecraft includes a plurality of thruster support mechanisms (TSMs), each TSM including a pointing arrangement and an elongated structural member, the structural member having a long dimension defining a first axis. For each TSM, a proximal portion of the structural member is attached to the pointing arrangement, at least one thruster is fixedly coupled with a distal portion of the structural member, and the pointing arrangement includes a first revolute joint, a second revolute joint, and a third revolute joint, the first revolute joint being rotatable about a first axis, the third revolute joint being rotatable about a third axis, the third axis being fixed with respect to the spacecraft; and the second revolute joint being rotatable about a second axis, the second axis being orthogonal to each of the first axis and the third axis.

In some examples, the spacecraft includes no thrusters other than the at least one thruster fixedly coupled with a distal portion of each structural member. In some examples, each TSM is articulable only by way of the first revolute joint, the second revolute joint, and the third revolute joint.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

Figure 1:
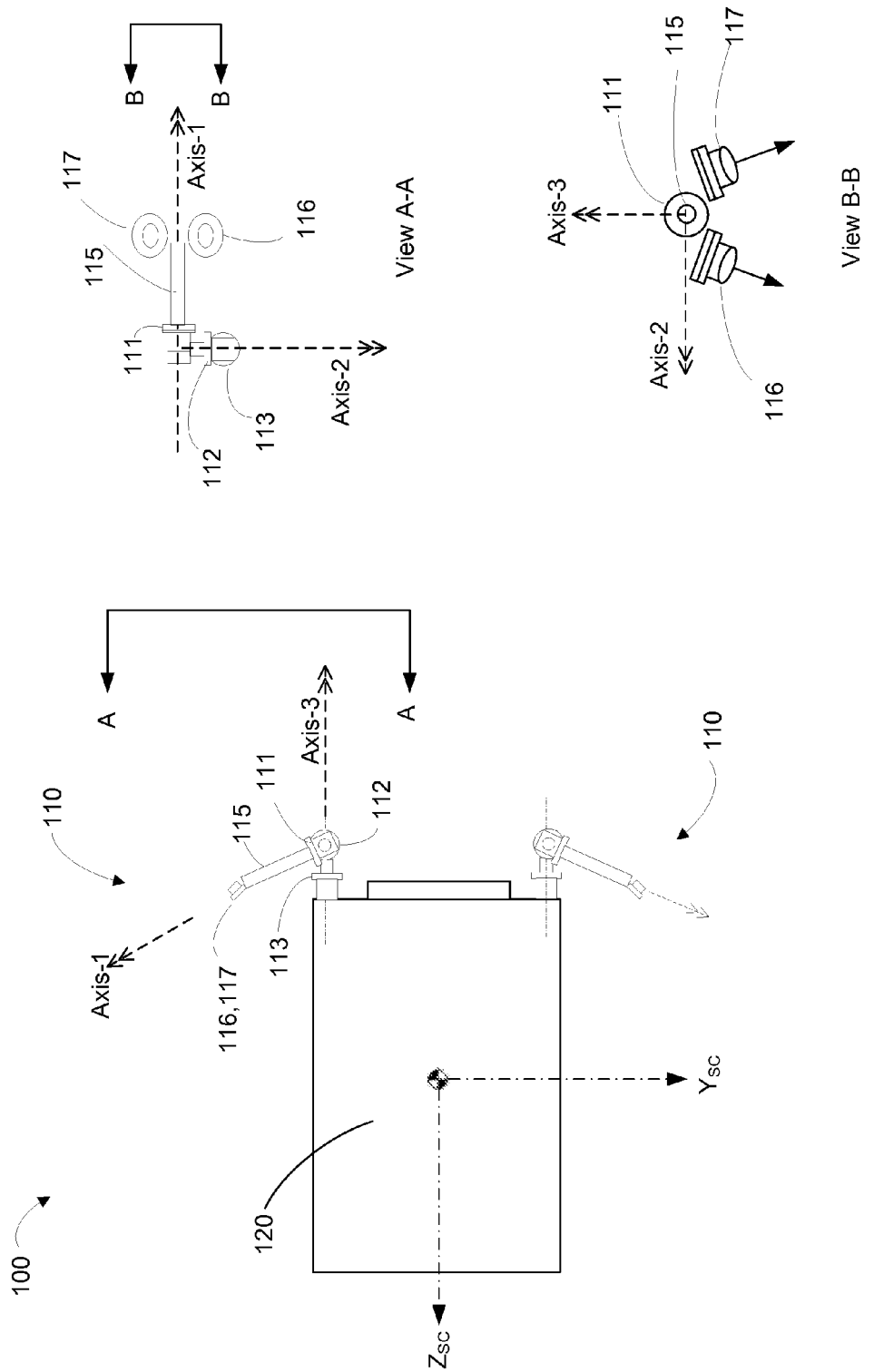
FIG. 1 illustrates an example implementation of a spacecraft, as deployed on orbit, according to the presently disclosed techniques.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The presently disclosed techniques permit a propulsion system wherein a reduced number of thrusters may be configured to perform multiple propulsion mission functions, including all of: orbit raising, stationkeeping (N-S and E-W), and momentum management. In some implementations, the propulsion system includes only electric thrusters that are configurable to perform all the above-mentioned functions. In some implementations, as few as two thrusters are selectably positioned to perform all the above-mentioned functions, in a system that has no single point failure mechanisms. In some implementations, the propulsion system includes two pairs of thrusters, each pair being fixedly coupled with a distal end of a boom, the boom having a proximal end coupled with a spacecraft by way of a positioning mechanism that includes three revolute joints.

An example implementation is illustrated in FIG. 1. In the illustrated implementation, a spacecraft 100 includes two thruster support mechanisms (TSMs) 110 for providing three axis positioning and orientation of at least one thruster. Each TSM 110 includes an elongated structural member ("boom") 115, a longitudinal axis of which is identified as "Axis-1". Proximate to a distal end of the boom 115 are disposed two thrusters, a primary thruster 116 and a redundant thruster 117. The primary thruster 116 and the redundant thruster 117 may be fixedly coupled with a distal portion of the boom 115 directly or by way of an intermediate structure (not illustrated) and/or radiator plate. As used herein, and in the claims, "fixedly coupled" means that a coupling between a thruster, for example, primary thruster 116, and the boom 115, is non-articulable, that is the coupling excludes any intermediate arrangement for articulating the thruster with respect to the boom. The "fixedly coupled" feature may include a rigid, semi-rigid, flexible, detachable and/or non-detachable mechanical joint between the thruster and the boom, with or without one or more intervening non-articulable elements disposed between the thruster and the boom. A proximal portion of boom 115 is coupled with a main body 120 of spacecraft 100 by way of a pointing arrangement that includes three revolute joints. Each revolute joint 111, 112, and 113 may be rotatably coupled to a respective actuator so as to be rotatable about a respective axis of rotation. More particularly, in the illustrated implementation, revolute joint 111 is rotatable about the Axis-1 (i.e., the longitudinal axis of boom 115); the revolute joint 113 is rotatable about an Axis-3 (parallel to the spacecraft Z (yaw) axis); and revolute joint 112 may be rotatable about an Axis-2 (defined to be orthogonal to each of Axis-1 and Axis-3).

In the illustrated implementation, two TSMs 110 are provided, each TSM 110 having a pair of thrusters fixedly attached thereto. As will be explained in more detail hereinbelow, each TSM is articulable over a range of positions and orientations such that each attached thruster may be selectably disposed so as to perform any of the multiple propulsion mission functions identified above. As a result, a robustly reliable propulsion system is achieved that may perform, with at least 2:1 redundancy, all propulsion mission functions, including all of: orbit raising, stationkeeping (N-S and E-W), and momentum management. In some implementations, a single thruster per TSM is contemplated, whereby all propulsion mission functions, including orbit raising, stationkeeping, and momentum management may be accomplished with as few as two thrusters, while still avoiding any single point failure mechanism that would cause an immediate loss of mission.

The propulsion mission functions contemplated by the present disclosure, include, but are not limited to momentum management and orbit control, orbit control including orbit raising, orbit lowering and stationkeeping (N-S and E-W) for geostationary and other Earth orbiting spacecraft. Typical requirements for such propulsion mission functions are described in detail in Hosick, incorporated by reference herein above, and may be summarized as follows.

Orbit raising functions relate to the task of transferring a spacecraft from an initial lower orbit (into which the spacecraft has been injected by a launch vehicle) to, for example, an intermediate orbit or an operational orbit or from an operational orbit to a graveyard orbit. Where a liquid chemical thruster is the propulsion technology chosen for performing the orbit raising function, the mass of the chemical propellant needed for orbit raising can be as much as half of the spacecraft total mass injected into the initial orbit by the launch vehicle. Where an electric thruster system is used for part or all of the orbit raising function, a substantial mass savings may be achieved, by virtue of the electric thruster's higher specific impulse (Isp) however, significantly more time must be allocated to the orbit raising phase of the spacecraft's life, as a result of the electric thruster's lower thrust. Orbit lowering functions relate to the task of transferring a spacecraft from an initial higher orbit to a lower orbit.

Once in an operational orbit, the propulsion system is responsible for maintaining correct orbital position and attitude throughout the life of the spacecraft. For a geostationary spacecraft, for example, the correct orbital position always lies in the plane of the earth's equator, at a particular assigned longitude. Various forces act on the spacecraft which, in the absence of propulsion stationkeeping functions, tend to move the spacecraft out of the desired orbital position. These forces arise from several sources including the gravitational effects of the sun and moon, the elliptical shape of the earth, and solar radiation pressure. Stationkeeping includes control of the inclination, eccentricity, and drift of the spacecraft. The orbit's inclination relates to the north-south position of the spacecraft relative to the earth's equator and may be maintained at a value acceptably close to zero by performing periodic north-south stationkeeping (NSSK) maneuvers. Drift is a measure of the difference in longitude of the spacecraft's subsatellite point and the desired geostationary longitude as time progresses and may be corrected by performing periodic east-west stationkeeping (EWSK) maneuvers. Eccentricity is a measure of the noncircularity of the spacecraft orbit, and may be controlled in the course of performing NSSK and/or EWSK maneuvers, or separately.

Once on-station, a spacecraft must maintain its attitude in addition to its orbital position. Disturbance torques, such as solar pressure, work to produce undesired spacecraft attitude motion. Momentum wheel stabilization systems are commonly used to counteract such disturbance torques. Such systems typically include one or more momentum wheels and control loops to sense and control changes in the spacecraft attitude. The control loops determine the required speed of the wheels to absorb or off-load momentum based on a sensed spacecraft attitude. Momentum stored in the momentum wheels must be periodically unloaded, to keep the momentum wheels within a finite operable speed range. Momentum wheel unloading is typically accomplished by applying an external torque to the spacecraft by firing a thruster, a propulsion mission function referred to herein as momentum management.

The present inventors have appreciated that all three of the above-described propulsion mission functions—orbit raising, stationkeeping, and momentum management—may be accomplished by a reduced number of thrusters as a result of mounting the thrusters on TSM's as described herein.

Figure 2:
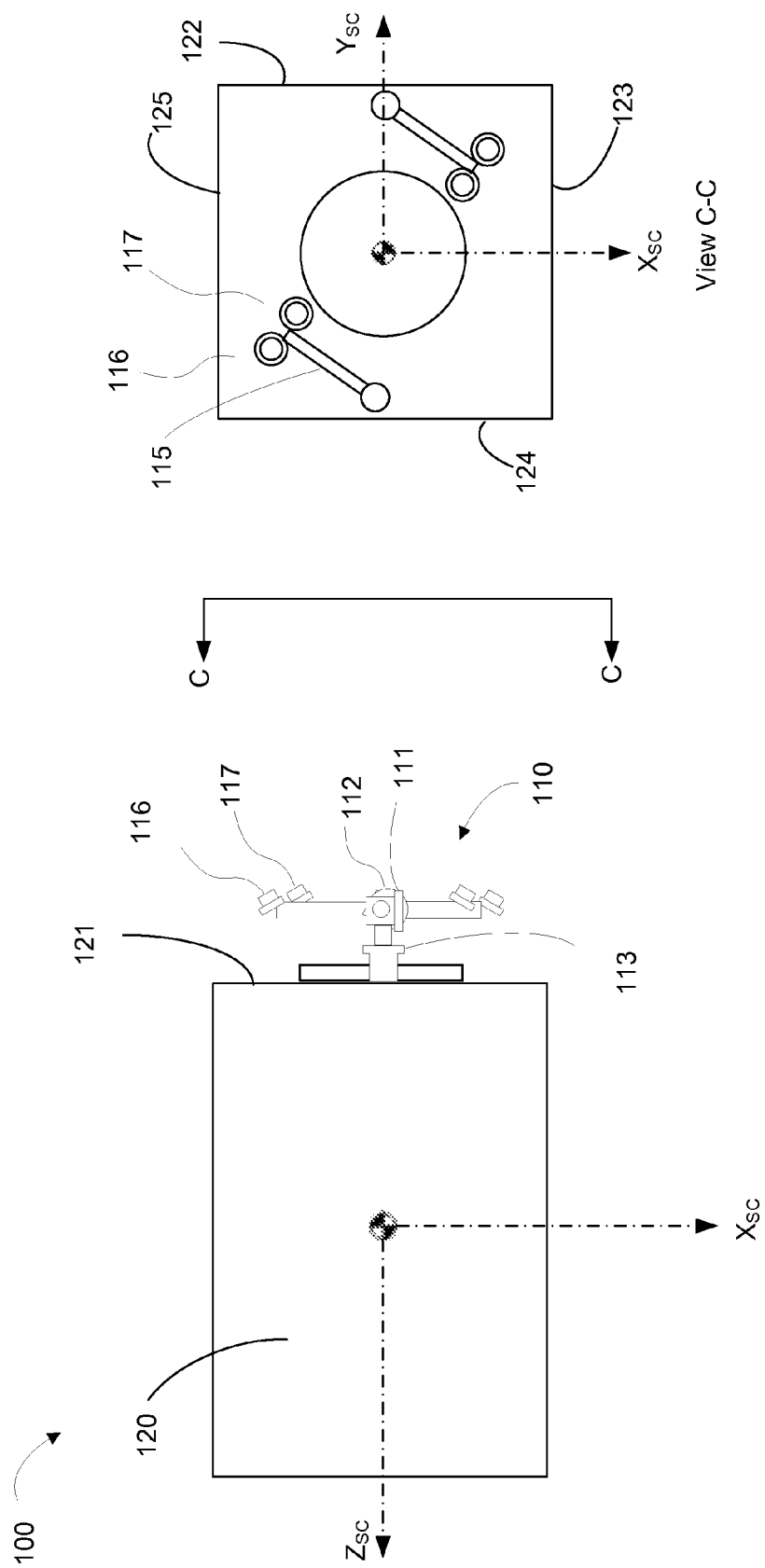
FIG. 2 illustrates an example implementation of the spacecraft in a launch configuration.

Referring again to FIG. 1, the illustrated spacecraft 100 includes two TSMs 110 configured in an example of a deployed (or "on-orbit) configuration. Referring now to FIG. 2, the spacecraft 100 is illustrated in an example of a launch configuration, wherein the TSMs 110 are disposed ("stowed") proximate to an external panel 121 of the spacecraft main body 120. In some implementations, the external panel 121 may be disposed, in the launch configuration, in a lower, or aft, positioned proximate to an upper portion of a launch vehicle. In some implementations, the external panel 121, in the on orbit configuration, may be disposed in an anti-Earth direction, that is facing opposite to a nadir position on the Earth. In some implementations, the TSMs 110, in the launch configuration, may be disposed so as to be substantially more of external spacecraft external panels 122, 123, 124 and 125. It will be appreciated that by appropriate rotation of revolute joints 111, 112 and 113, the TSM 110 may be reconfigured from the stowed arrangement illustrated in FIG. 2 to the deployed arrangement illustrated in FIG. 1.

Figure 3:
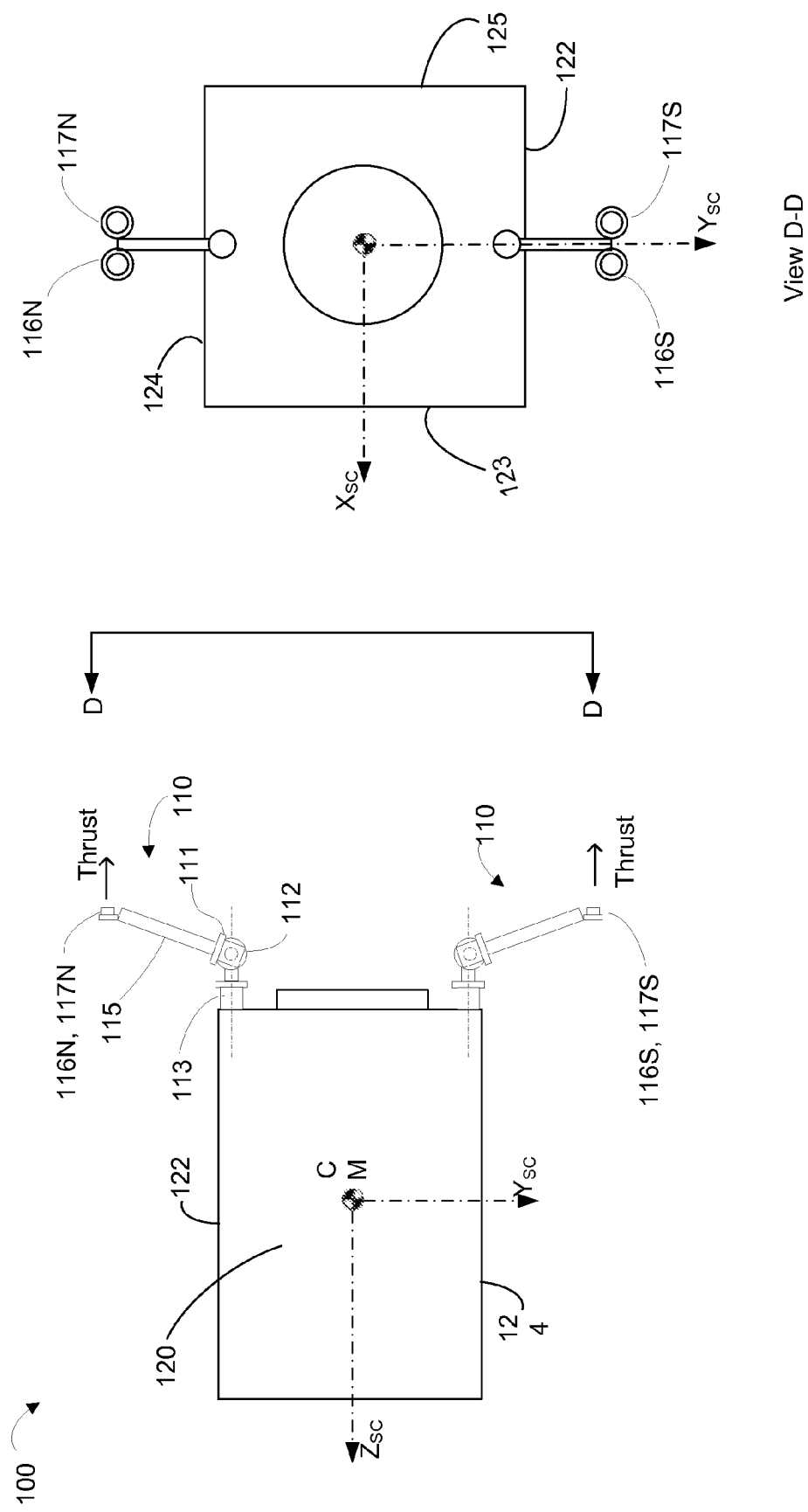
FIG. 3 illustrates an example implementation of the spacecraft in an on-orbit configuration appropriate for an orbit raising maneuver.

Referring now to FIG. 3, the spacecraft 100 is illustrated in an example of an on-orbit configuration appropriate for an orbit raising maneuver. In the illustrated implementation, each of two TSMs 110 has been deployed to an orientation such that a thrust vector of at least one thruster is substantially aligned with the spacecraft Z-axis. It will be appreciated that the spacecraft Z-axis during the orbit raising maneuver may be substantially aligned with the spacecraft velocity vector. The spacecraft y-axis ($Y_{SC}$) is ordinarily aligned orthogonal to the plane of the orbit, (i.e., in a substantially north-south direction). The spacecraft x-axis, not illustrated, is orthogonal to $Z_{SC}$ and $Y_{SC}$ and may be aligned, during the orbit raising maneuver, with an orbit radius. It is contemplated that a substantially simultaneous firing of one or more thruster pairs may increase spacecraft velocity along the Z axis. Simultaneous firing of a thruster pair may include, for example firing thruster 116N and 116S together. In some implementations, two or more pairs of thrusters may be simultaneously fired. Where each thruster pair have a similar thrust magnitude and moment arm with respect to the spacecraft center of mass (CM), disturbance torques generated by such simultaneous firing will generally be small. The disturbance torques may be further minimized by appropriate throttling of the thrusters and/or by adjusting thrust vector orientation by adjusting a rotation angle of one or more of revolute joints 111, 112, and 113.

Figure 4:
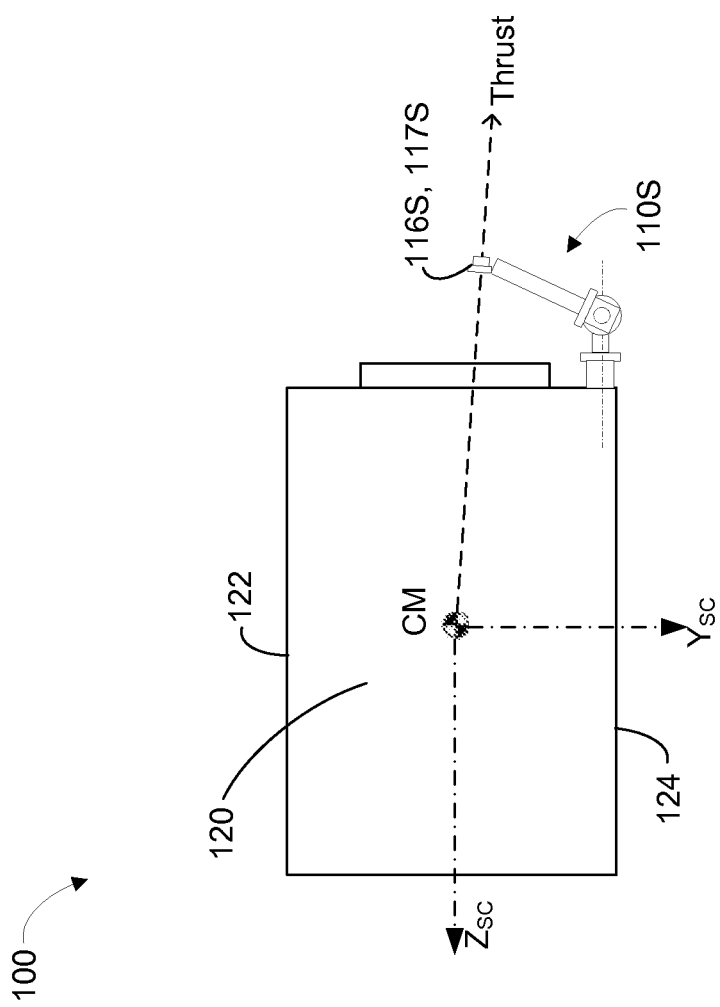
FIG. 4 illustrates an example of the spacecraft arranged in an on-orbit configuration appropriate for an orbit raising maneuver in the event of a failure of a thruster support mechanisms (TSM).

FIG. 4 illustrates an example of the spacecraft 100 arranged in an on-orbit configuration appropriate for an orbit raising maneuver in the event of a failure of TSM 110N (omitted for clarity of illustration) or the loss of operability of the thruster(s) disposed on TSM 110N. In the illustrated implementation, TSM 110S has been articulated to an orientation such that a thrust vector of at least one of thruster 116S and 117S, is substantially aligned with the spacecraft CM. It will be appreciated that the illustrated line of thrust may not be aligned with the nominal spacecraft Z-axis. Accordingly, in order to provide that the line of thrust both passes through the spacecraft CM and is substantially aligned with the spacecraft velocity vector, the spacecraft may be controlled so as to operate in a somewhat "crab-like" mode, such that the spacecraft Z-axis has a certain angular offset from the spacecraft velocity vector. While firing one or both of thrusters 116S and 117S such that a resultant thrust vector passes nominally through the spacecraft CM, any disturbance torques generated by such firing will generally be small. The disturbance torques may be further minimized by appropriate throttling of the thrusters and/or by adjusting a thrust vector orientation by adjusting a rotation angle of one or more of revolute joints 111, 112, and 113.

Figure 5:
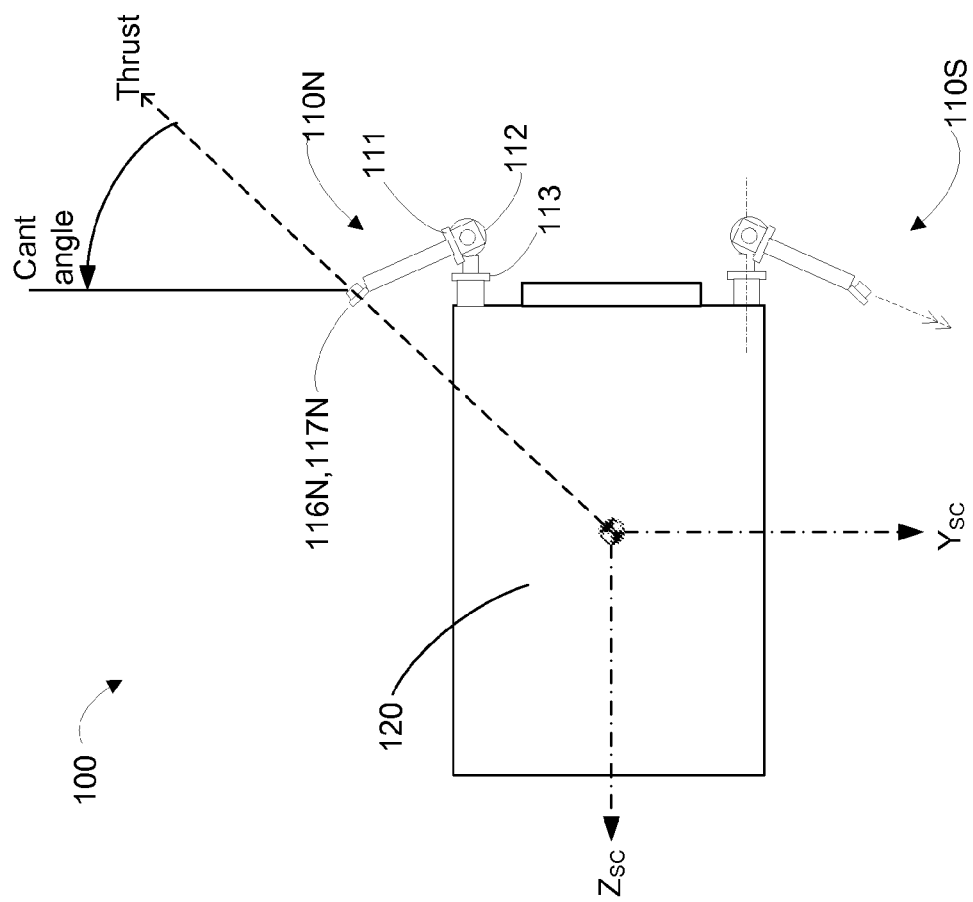
FIG. 5 illustrates an example of the spacecraft arranged in an on-orbit configuration appropriate for performing a north south stationkeeping (NSSK) maneuver.

FIG. 5 illustrates an example of the spacecraft 100 arranged in an on-orbit configuration appropriate for performing an NSSK maneuver. In the illustrated implementation, each of two TSMs 110 has been deployed to an orientation such that a thrust vector of at least one thruster is substantially aligned with the spacecraft CM and has a substantial component in the north-south direction. With respect to a conventional spacecraft coordinate system, it will be appreciated that, during such stationkeeping maneuvers, $Z_{SC}$ (or "yaw" axis) is ordinarily aligned along an orbit radius. The $Y_{SC}$ (or "pitch" axis) is ordinarily aligned, orthogonal to the plane of the orbit, (i.e., in a north-south direction). The spacecraft x-axis, not illustrated, is orthogonal to $Z_{SC}$ and $Y_{SC}$, substantially aligned with the spacecraft velocity vector, and may be said to be aligned in an east-west direction.

In some implementations, a NSSK maneuver may be performed by firing one or both of thrusters 116N and 117N, such that a resultant thrust vector passes through the spacecraft CM. It may be observed that the thrust vector has a component of thrust in both the north-south direction and the radial direction. For a geostationary satellite, NSSK maneuvers may ordinarily be performed at opposite sides of the orbit separated by 180° of orbital arc (12 hours). Accordingly, in some implementations, a nominal NSSK maneuver strategy may contemplate a firing of one or both of thrusters 116N and 117N at a first orbital location, followed by firing of one or both of thrusters 116S and 117S at an orbital location approximately 180° from the first. As a result of executing such a maneuver strategy, an increase in orbital eccentricity caused by a thrust vector component in the radial direction during the first firing is offset by an approximately equal and opposite thrust component at the location of the second firing.

Referring still to FIG. 5, it will be appreciated that a NSSK maneuver may be performed by firing one or more of the thrusters disposed on a particular boom 115. For example, both thruster 116N and thruster 117N are operable to provide thrust in the north direction. In the event of a failure of one of the thruster 116N and the thruster 117N the remaining thruster may be utilized. Advantageously, in some implementations, a cant angle for each of the thruster 116N and the thruster 117N may be substantially identical. As a result, in event of a thruster failure, a redundant thruster may be used without a change in the cant angle. Accordingly, there is no fuel penalty associated with a switch from a primary to a redundant thruster, since the magnitude of the thrust in the north/south direction is substantially identical.

In the event of a failure of one of the TSMs 110, a NSSK maneuver strategy may contemplate performing NSSK maneuvers only at a single orbital position. For example, in the event of a failure of TSM 110N, the contingency NSSK maneuver strategy may include exclusively firing thrusters disposed on TSM 110S. The contingency NSSK maneuver strategy may also contemplate thruster firings that counteract a buildup in orbital eccentricity that may otherwise result from performing repeated NSSK maneuvers at a single orbital position. For example, still assuming a failure of TSM 110N, following a north-south stationkeeping maneuver at a first orbital position using thrusters disposed on TSM 110S, a maneuver at a succeeding orbital position 12 hours later may be performed also using thrusters disposed on TSM 110S oriented to provide a thrust vector substantially in the radial direction. More particularly, during a period of time between thruster firings the TSM110S may be articulated between the configuration illustrated in FIG. 5 and the configuration illustrated in FIG. 4. As a result of such a strategy, NSSK may still be accomplished, even in the event of a TSM failure.

Figure 6:
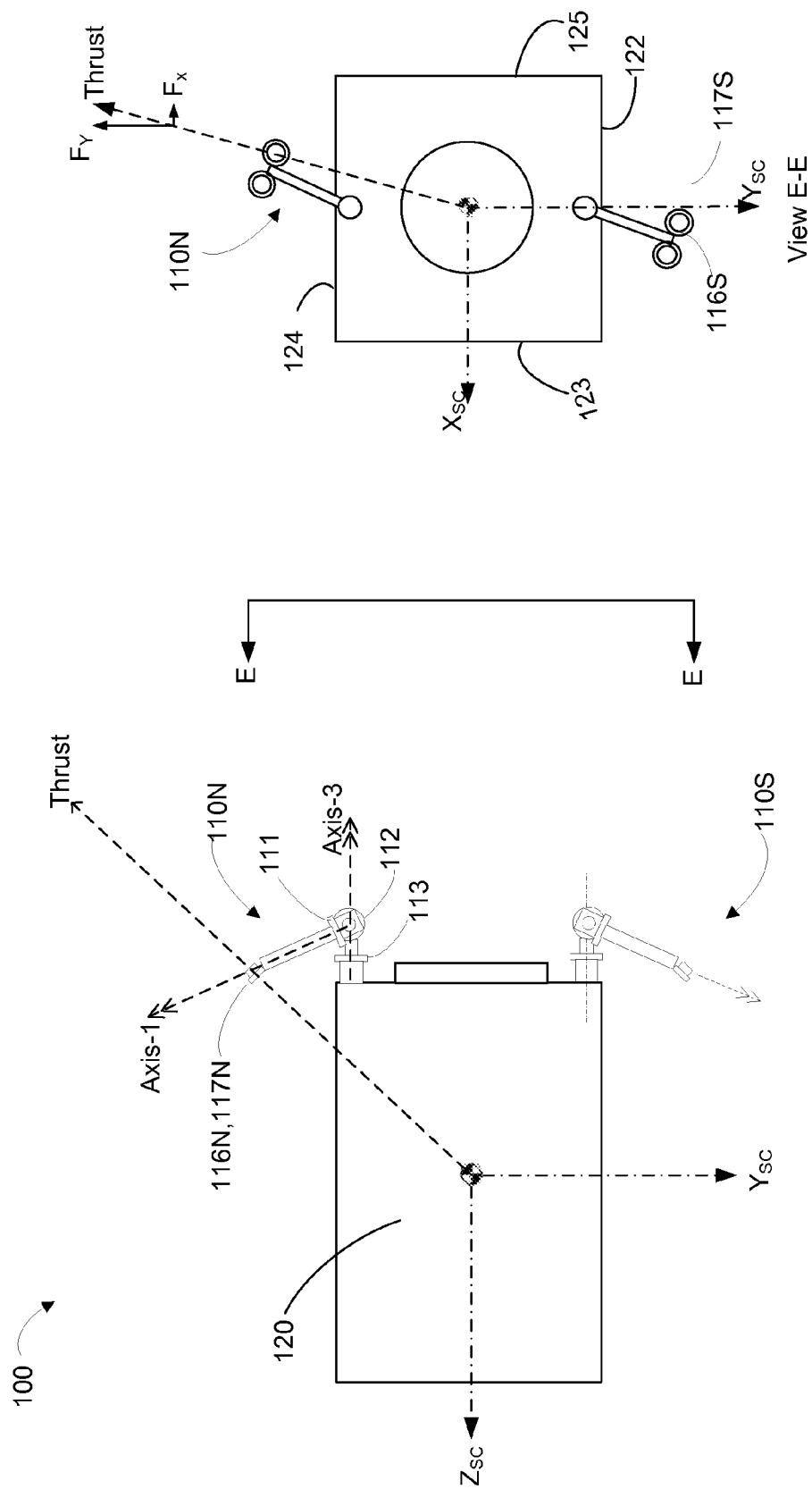
FIG. 6 illustrates an example of the spacecraft arranged in an on-orbit configuration appropriate for simultaneously performing a NSSK maneuver and an east west stationkeeping maneuver.

FIG. 6 illustrates an example of the spacecraft 100 arranged in an on-orbit configuration appropriate for simultaneously performing a NSSK maneuver and an EWSK maneuver. According to the illustrated technique, TSM 110N may be articulated such that a thrust vector is directed through the spacecraft CM and has a component of thrust in the east-west direction as well as in both the north-south direction and the radial direction. More particularly, referring now to view EE, it may be observed that by appropriate rotation of revolute joint 113 about axis 3 and by appropriate rotation revolute joint 111 about axis 1, a thrust vector may be caused to have an east-west component $F_Y$ as well as a north-south component $F_Y$.

Figure 7:
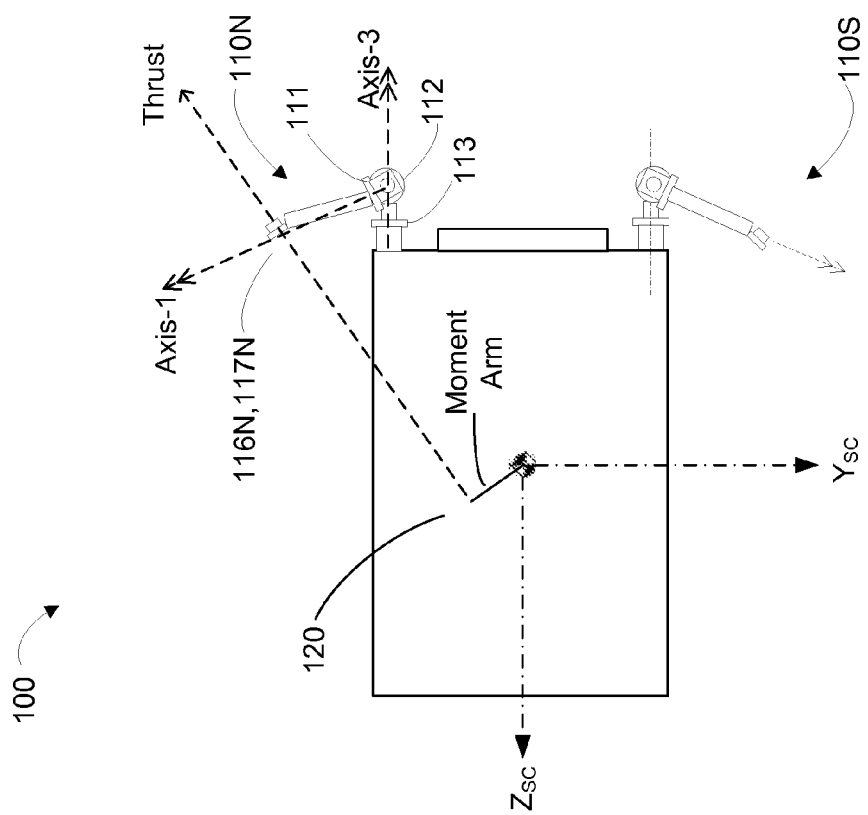
FIG. 7 illustrates an example of the spacecraft arranged in an on-orbit configuration appropriate for unloading or desaturating a momentum wheel

In view of the foregoing disclosure, it will be appreciated that the TSM 110 may be selectably articulated into a wide range of positions and orientations, by way of revolute joints 111, 112, and 113, appropriate to a particular mission phase and/or propulsion mission function to be accomplished. Where the propulsion mission function relates to a velocity change maneuver, either for orbit raising as discussed in connection with FIGS. 3 and 4, or for stationkeeping as discussed in connection with FIGS. 5 and 6, it is desirable that the TSM 110 be articulated such that a resultant thrust vector is substantially aligned with the spacecraft CM. The presently disclosed techniques may also be readily adapted to momentum management propulsion functions, which require applying control torques resulting from firing one or more thrusters that are directed such that a resulting thrust vector defines a moment arm with respect to the satellite's CM. For example, referring now to FIG. 7, it is illustrated that articulation of TSM 110N may result in a thrust vector being offset from the spacecraft CM such that firing one or both of thrusters 116N and 117N will produce a torque about spacecraft roll axis $X_{SC}$. Thus, a firing one or both of thrusters 116N and 117N when the TSM 110N is articulated to the position shown in FIG. 7, may be performed in order to unload or desaturate a momentum wheel.

Such a momentum management operation may be executed during a stationkeeping, or orbit raising operation, or separately therefrom. For example, in some implementations, stationkeeping maneuvers may be scheduled to occur at twice daily orbital positions, whereas momentum management operations may be scheduled to occur at intervals between stationkeeping maneuvers. More particularly, in some implementations, momentum management operations may be scheduled for execution at times separated by approximately six-hour (90° of orbital arc) from the stationkeeping maneuvers.

Figure 8:
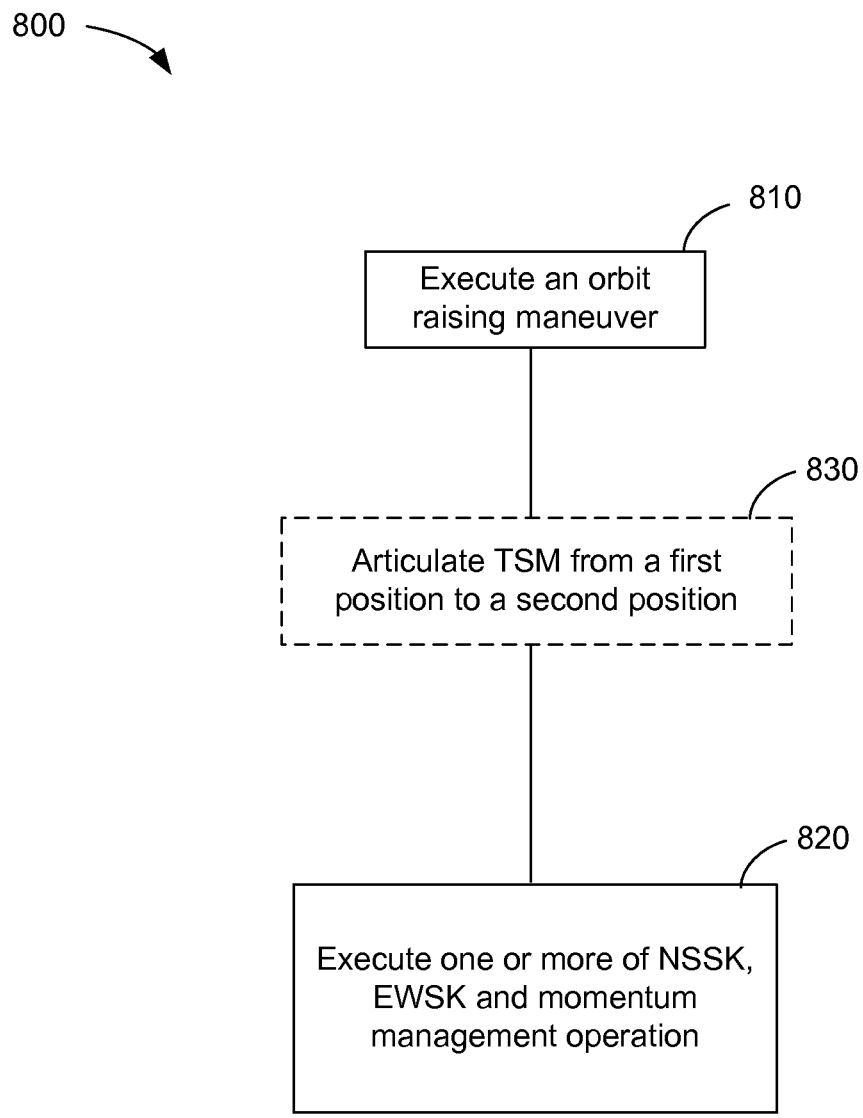
FIG. 8 illustrates a method for performing orbit raising, stationkeeping and momentum management for a spacecraft.

Referring now to FIG. 8, a method 800 of performing orbit raising, stationkeeping and momentum management for a spacecraft is illustrated. The method 800 may begin, at block 810 with raising an orbit of the spacecraft, using at least one thruster disposed on the spacecraft. At block 820, one or more of north-south stationkeeping, east-west stationkeeping, and momentum management may be performed with the thrusters. As described hereinabove, the spacecraft includes at least one TSM. The at least one TSM includes a pointing arrangement and an elongated structural member, the structural member having a long dimension defining a first axis. A proximal portion of the structural member is attached to the pointing arrangement, and the at least one thruster is fixedly coupled with a distal portion of the structural member. The pointing arrangement includes a first revolute joint, a second revolute joint, and a third revolute joint, the first revolute joint being rotatable about the first axis; the third revolute joint being rotatable about a third axis, the third axis being fixed with respect to the spacecraft; and the second revolute joint being rotatable about a second axis, the second axis being orthogonal to each of the first axis and the second axis. Advantageously the spacecraft includes no thrusters other than the above described at least one thruster fixedly coupled with the distal portion of the structural member, and the TSM is articulable only by way of the first revolute joint, the second revolute joint, and the third revolute joint. Because the at least one thruster is fixedly coupled with the distal portion of the structural member, the disclosed arrangement advantageously, may avoid flexing and bending of propellant lines and electrical harness proximate to the distal portion of the structural member.

In some implementations, the method 800 further includes articulating the TSM from a first position and orientation to a second position and orientation, block 830. Raising the orbit occurs with the TSM disposed in the first orientation and position and the performing one or more of north-south stationkeeping, east-west stationkeeping, and momentum management occurs with the TSM disposed in the second orientation.

Thus, techniques for supporting and three-axis positioning spacecraft thrusters have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
   a main body;
   at least one thruster; and
   a thruster support mechanism (TSM), the TSM including a pointing arrangement and an elongated structural member, the structural member having a long dimension defining a first axis, the pointing arrangement including a first revolute joint, a second revolute joint, and a third revolute joint wherein:
      a proximal portion of the structural member is attached to the first revolute joint of the pointing arrangement;
      the at least one thruster is fixedly coupled with a distal portion of the structural member;
      the first revolute joint is configured to rotate the structural member about the first axis;
      the third revolute joint is rotatable about a third axis, the third axis being fixed with respect to the main body;
      the second revolute joint is rotatable about a second axis, the second axis being orthogonal to each of the first axis and the third axis; and
      the third revolute joint is proximate to the main body of the spacecraft and the second revolute joint is disposed between the first revolute joint and the third revolute joint.

2. The spacecraft of claim 1, wherein the TSM is articulable such that the at least one thruster may be selectably disposed so as to provide a thrust vector oriented for a selected one or both of orbit control and momentum management.

3. The spacecraft of claim 1, wherein the TSM is articulable such that the at least one thruster may be selectably disposed so as to provide a thrust vector oriented for a selected one or more of momentum management, orbit raising, orbit lowering, north-south stationkeeping, east-west stationkeeping, and eccentricity control.

4. The spacecraft of claim 3, wherein the TSM is articulable only by way of the first revolute joint, the second revolute joint, and the third revolute joint.

5. The spacecraft of claim 4, wherein the TSM is articulable such that the at least one thruster may be selectably disposed so as to simultaneously perform north-south stationkeeping and east-west stationkeeping.

6. The spacecraft of claim 4, wherein the TSM is articulable such that the at least one thruster may be selectably disposed so as to simultaneously perform north-south stationkeeping, east-west stationkeeping and momentum management.

7. The spacecraft of claim 4, wherein the TSM is articulable such that the at least one thruster may be selectably disposed so as to simultaneously perform orbit raising and momentum management.

8. The spacecraft of claim 1, wherein the at least one thruster is an electric thruster.

9. The spacecraft of claim 1, wherein the third revolute joint is proximate to an aft surface of the main body of the spacecraft.

10. The spacecraft of claim 9, wherein the third axis is parallel to a yaw axis of the spacecraft, the yaw axis being substantially aligned with an orbit radius during a stationkeeping maneuver.

11. A method comprising:
    raising an orbit of a spacecraft, with at least one thruster disposed on the spacecraft; and
    performing, with the at least one thruster, one or more of north-south stationkeeping, east-west stationkeeping, or momentum management; wherein:
       the spacecraft includes at least a first thruster support mechanism (TSM), the first TSM including a pointing arrangement and an elongated structural member, the structural member having a long dimension defining a first axis, the pointing arrangement including a first revolute joint, a second revolute joint, and a third revolute joint;
       a proximal portion of the structural member is attached to the first revolute joint of the pointing arrangement;
       the at least one thruster is fixedly coupled with a distal portion of the structural member; and
       the first revolute joint is configured to rotate the structural member about the first axis;
       the third revolute joint is rotatable about a third axis, the third axis being fixed with respect to the spacecraft;
       the second revolute joint is rotatable about a second axis, the second axis being orthogonal to each of the first axis and the third axis; and the third revolute joint is proximate to the main body of the spacecraft and the second revolute joint is disposed between the first revolute joint and the third revolute joint.

12. The method of claim 11, further comprising:
articulating the first TSM from a first position and orientation to a second position and orientation, wherein, the raising the orbit occurs with the first TSM disposed in the first orientation and position, and the performing the one or more of north-south stationkeeping, east-west stationkeeping, or momentum management occurs with the first TSM disposed in the second orientation and position.

13. A spacecraft comprising:
a plurality of thruster support mechanisms (TSMs), each TSM including a pointing arrangement and an elongated structural member, wherein, for each TSM:
the pointing arrangement including a first revolute joint, a second revolute joint, and a third revolute joint;
the structural member has a long dimension defining a first axis;
a proximal portion of the structural member is attached to the first revolute joint of the pointing arrangement;
at least one thruster is fixedly coupled with a distal portion of the structural member;
the first revolute joint is configured to rotate the structural member about the first axis;
the third revolute joint is rotatable about a third axis, the third axis being fixed with respect to the spacecraft;
the second revolute joint is rotatable about a second axis, the second axis being orthogonal to each of the first axis and the third axis; and
the third revolute joint is proximate to the main body of the spacecraft and the second revolute joint is disposed between the first revolute joint and the third revolute joint.

14. The spacecraft of claim 13, wherein the spacecraft includes no thrusters other than the at least one thruster fixedly coupled with a distal portion of each structural member.

15. The spacecraft of claim 13, wherein each TSM is articulable only by way of the first revolute joint, the second revolute joint, and the third revolute joint.

* * * * *